(12) United States Patent
Stadtfeld

(10) Patent No.: US 7,651,383 B2
(45) Date of Patent: Jan. 26, 2010

(54) METHOD OF LAPPING GEARS

(75) Inventor: Hermann J. Stadtfeld, Webster, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 11/974,272

(22) Filed: Oct. 12, 2007

(65) Prior Publication Data

US 2008/0113592 A1 May 15, 2008

Related U.S. Application Data

(60) Provisional application No. 60/851,262, filed on Oct. 12, 2006, provisional application No. 60/852,490, filed on Oct. 18, 2006.

(51) Int. Cl.
*B24B 49/00* (2006.01)
*B24B 51/00* (2006.01)
(52) U.S. Cl. .................... 451/5; 409/67; 451/47
(58) Field of Classification Search ............ 409/25, 409/26, 27, 38, 39, 50, 51, 66, 67, 68, 69, 409/70; 451/5, 47, 48, 114, 147
See application file for complete search history.

(56) References Cited

U.S. PATENT DOCUMENTS

| 3,712,000 | A | | 1/1973 | Spear | |
|---|---|---|---|---|---|
| 3,986,305 | A | * | 10/1976 | Gunter | 451/5 |
| 4,848,040 | A | * | 7/1989 | Nishino | 451/5 |
| 5,092,720 | A | * | 3/1992 | Abysov et al. | 409/37 |
| 5,116,173 | A | * | 5/1992 | Goldrich | 409/13 |
| 5,341,699 | A | * | 8/1994 | Rouverol | 74/462 |
| 6,120,355 | A | | 9/2000 | Stadtfeld et al. | |
| 6,390,893 | B1 | * | 5/2002 | Stadtfeld et al. | 451/47 |
| 2005/0239385 | A1 | * | 10/2005 | Jankowski et al. | 451/540 |

FOREIGN PATENT DOCUMENTS

| CH | 348312 | 8/1960 |
|---|---|---|
| DE | 3730249 | 4/1989 |

* cited by examiner

*Primary Examiner*—Timothy V Eley
(74) *Attorney, Agent, or Firm*—Robert L. McDowell

(57) ABSTRACT

The present invention provides a controllable gear lapping process whereby the lapping process may be modified at discrete locations on the tooth surface in order to selectively modify the tooth flank surface.

17 Claims, 4 Drawing Sheets

METHOD OF LAPPING GEARS

This application claims the benefit of U.S. Provisional Patent Application No. 60/851,262 filed Oct. 12, 2006 and U.S. Provisional Patent Application No. 60/852,490 filed Oct. 18, 2006, the disclosures of both applications being hereby incorporated by reference.

FIELD OF THE INVENTION

The present invention is directed to lapping gears and in particular is directed to a method of controlled material removal at different locations on a tooth surface.

BACKGROUND OF THE INVENTION

Lapping is a well established process for finishing the tooth surfaces of bevel gears. It is a process that provides an economical alternative to other hard finishing processes for bevel gears.

In the lapping process, a pinion and ring gear are mounted, via appropriate workholding equipment, to respective spindles in a lapping machine which has the same basic design as a testing machine. In most instances of rolling of the gear set, the pinion is the driving member and the ring gear is braked. The gears are rolled in mesh and lapping compound, which can be a mixture of oil (or water) and silicon carbide or similar abrasive, is poured into the meshing zone. An example of lapping and/or testing machines can be found in U.S. Pat. No. 6,120,355 to Stadtfeld et al.

Most lapping and testing machines have three degrees of freedom available for realizing relative motion between a ring gear and pinion. The first freedom being relative movement in the direction of the ring rear axis (gear cone distance) which shall be referred to as direction G or the G-axis, the second freedom being relative movement in direction of the pinion axis (pinion cone distance) which shall be referred to as direction P or the P-axis, and the third degree of freedom being distance between the ring gear and pinion axes which shall be referred to as direction E or the E-axis. The direction E is also known as the "hypoid offset" or "pinion offset."

In lapping or testing processes, relative movement in the E, P and G directions effect positional changes in the contact pattern of the members of the gear set, in effect modifying the contact pattern. Lapping involves rotating the gear members in mesh with contact at a desired position on the tooth surfaces. Thus, the members are located at particular E and P positions along with a particular G-axis position to effect the desired backlash.

Typically, the E, P and G movements each have an effect on both the lengthwise and depthwise position of the localized tooth contact pattern, the primary effect of the E-axis movement being on the relative lengthwise position of the contact pattern, the primary effect of P-axis movement being on the relative depthwise position of the contact pattern, and the primary effect of G-axis movement being on the backlash.

As the gear set is lapped, contact is usually shifted from the center of the tooth toward one of the outer (heel) or inner (toe) portions of the tooth surface by changing the E and P settings as necessary to effect such a shifting of the contact position. As E and P are changed to effect the shifting, the G-axis position must also be changed to maintain the desired backlash. When the desired heel or toe position is reached, E and P axes positions are again changed to shift contact to the other of the heel or toe positions with the changing E and P positions being accompanied by an appropriate G-axis change to maintain backlash. The contact position is then returned to the beginning position at the center of the tooth. Lapping carried out by shifting of contact from heel-center-toe (or toe-center-heel) along the tooth length as described above may be referred to as "3 point sweep lapping."

Material removal is different in different areas or "zones" of a tooth flank surface depending on local sliding velocities, normal forces as well as hydrodynamic effects which support or prevent the sufficient access of lapping compound between the flanks in the contacting zone. The material removed on the pinion member is also different than the amount of material removal on the ring gear flank surfaces. One reason for this is the usual lower number of teeth on a pinion results in more pinion revolutions per unit of time than ring gear revolutions. Another reason is the different surface curvature and velocity direction of a pinion versus a ring gear results in different trends in material removal.

The consolidation of different effects and dependencies leads to a complex higher order relationship between lapping parameters and the amount of material removed on the tooth flank surfaces. Lapping part programs in modern lapping machines, such as the type disclosed in U.S. Pat. No. 6,120,355, normally use three target points (at heel, center and toe) to move the contact zone in a slow motion between those three points (while the axis rotates at up to 2000 RPM or more). In general the pinion drives the ring gear which provides some resistance with a rather low torque usually between 3 and 30 Nm. The pinion changes the direction of rotation to lap the opposite flanks (e.g. starting with coast side lapping followed by drive side lapping). The sequence of coast side lapping and drive side lapping is preferably repeated several times to complete a lapping cycle. The gear torque can also be changed from resisting the pinion rotation to the same direction of the pinion rotation in order to lap the opposite flanks. The combination of two directions of rotation and two directions of torque application enable a so-called "four quadrant" operation.

Developing a lapping program for a certain gear design requires a significant practical experience since the influence of a lapping process on a flank surface is complex and usually difficult to control. There are no theoretical aids that can help to reliably predict the influence of lapping on the tooth contact pattern, the motion transmission error or the flank form.

As a result, there are no coordinate measurements conducted subsequent to lapping to detect and improve the flank surface versus a nominal flank form. The most common measurements after lapping are roll tests which show the tooth contact under light load and the transmission quality. However, if, for example, the transmission error is too large or the contact pattern has the wrong position within the boundaries of the teeth, it is not possible to calculate changes to the lapping process in order to achieve the desired results. Presently, corrections to the lapping process are made intuitively and/or by trial and error.

SUMMARY OF THE INVENTION

The present invention provides a controllable gear lapping process whereby the lapping process may be modified at discrete locations on the tooth surface in order to selectively modify the tooth flank surface.

The inventive method of lapping a gear set having first and second gear members comprises defining a plurality of grid points on the tooth flank surfaces of each of the first and second gear members. A lapping correction is determined for more than one, preferably all, of the plurality of grid points with the lapping correction defining an amount of lapping at each of the more than one of the plurality of grid points whereby an amount of stock material is removed at each of the more than one of the plurality of grid points and wherein the amount of stock material removed at each of the more than one of the plurality of grid points is dependent upon the magnitude of the lapping correction at the respective each of the more than one of the plurality of grid points. The gear set is lapped by rotating the first gear member in mesh with the second gear member in a manner such that contact between the members is shifted from at least a first grid point to a second grid point whereby lapping contact is maintained at each contacted grid point for a time sufficient for removal of the predetermined amount of stock material at each respective contacted grid point.

DETAILED DESCRIPTION OF THE PREFERRED EMBODIMENT

Figure 1:
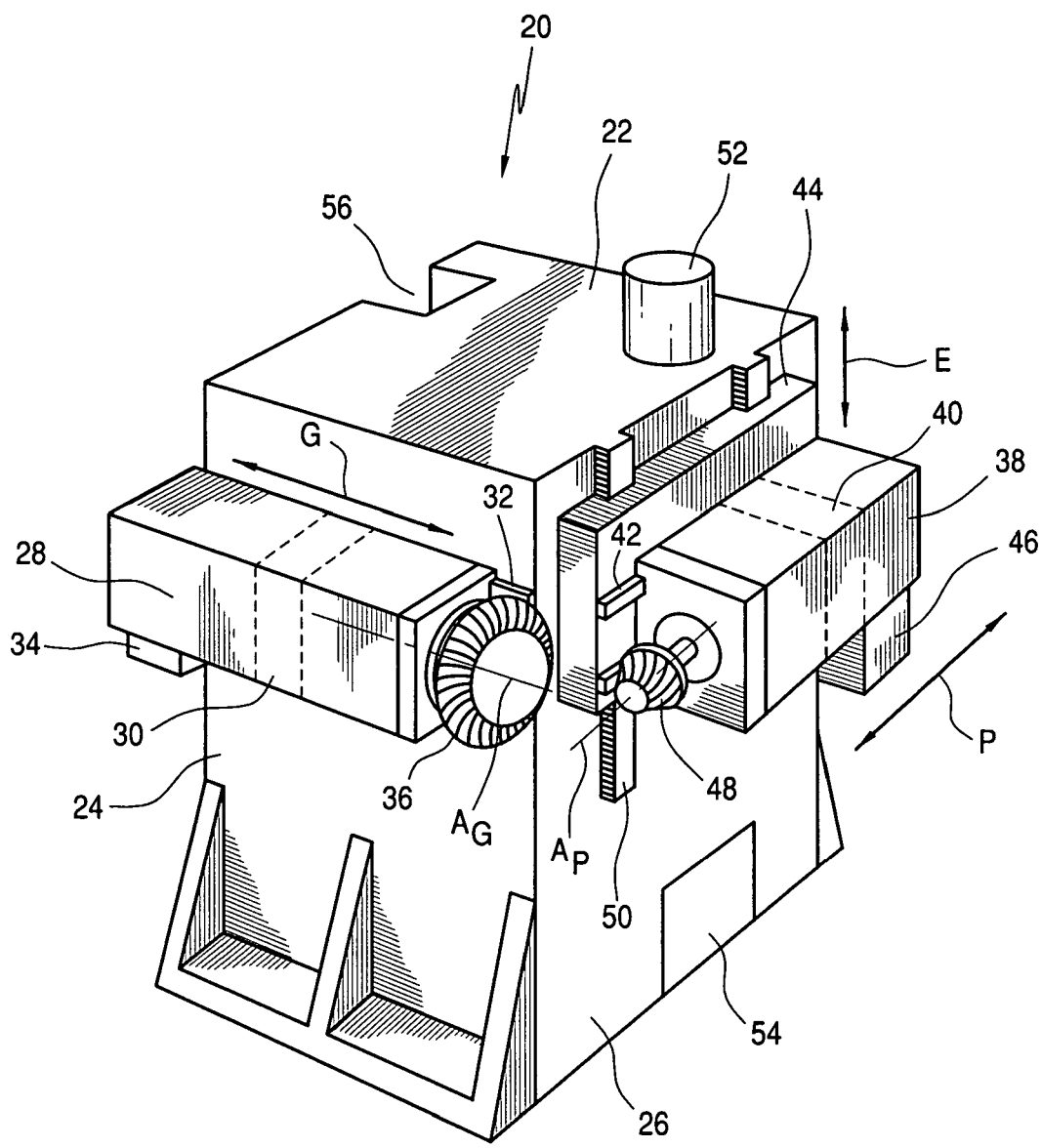
FIG. 1 schematically illustrates a known type of gear lapping machine.

The details of the present invention will now be discussed with reference to the accompanying drawings which illustrate the present invention by way of example only. In the drawings, similar features or components will be referred to by like reference numbers. In the context of the present invention, the term "bevel" gears is understood to be of sufficient scope to include those types of gears known as bevel gears, "hypoid" gears, as well as those gears known as "crown" or "face" gears, and further includes such gear types having longitudinally extending straight or curved teeth.

A lapping machine as in previously mentioned U.S. Pat. No. 6,120,355 is illustrated in FIG. 1 and designated generally by 20. For ease in viewing the various machine components, FIG. 1 illustrates the inventive machine without doors and exterior sheet metal. The machine 20 comprises a single column 22 that may also be thought of as the machine frame. Column 22 comprises at least three sides, preferably four sides, with at least two of the sides, first side 24 and second side 26, being perpendicular to one another. Each of the first and second sides comprises a width and a height (as viewed in FIG. 1).

First side 24 includes first workpiece spindle 28 which is rotatable about axis $A_G$ and is preferably driven by a direct drive motor 30, preferably liquid-cooled, mounted between front and rear spindle bearings (not shown). Spindle 28 is movable along the width of first side 24 in direction G on ways 32 attached directly to column 22. Movement of spindle 28 in direction G is provided by motor 34 through a direct-coupled ballscrew (not shown). Preferably, a bevel ring gear member 36 is releasably mounted to spindle 28 by suitable workholding equipment as is known in the art.

Second side 26 includes second workpiece spindle 38 which is rotatable about axis $A_P$ and is preferably driven by a direct drive motor 40, preferably liquid-cooled, mounted between front and rear spindle bearings (not shown) with motor 40 capable of attaining a pinion rotation of about 4000 RPM (the RPM of motor 30 would be: pinion RPM/ratio of the gear set). A tank for holding lapping compound is preferably placed under second spindle 38 adjacent to second side 26 as outlined by 54. A cutout area 56 of the column 22 may be included at an area of the column remote from the spindles for placement of any necessary electrical transformers.

Spindle 38 is movable along the width of second side 26 in direction P on ways 42 attached to slide 44. Movement of spindle 38 in direction P is provided by motor 46 through a direct-coupled ballscrew. Preferably, a pinion member 48 is releasably mounted to spindle 38 by suitable workholding equipment as is known in the art. Workpiece spindle 38 is also movable along the height of second side 26 in direction V since slide 44 is movable in the E direction via ways 50 with movement being provided by motor 52 through a direct-coupled ballscrew. Directions G, P and E are mutually perpendicular with respect to one another. For practical purposes as well as for purposes of illustration, in FIG. 1, the E direction is vertical.

Movement of first work spindle 28 in direction G, second work spindle 38 in direction P, slide 44 in direction E, as well as first spindle rotation and second spindle rotation, is imparted by the separate drive motors 34, 46, 52, 30 and 40 respectively. The above-named components are capable of independent movement with respect to one another or may move simultaneously with one another. Each of the respective motors is associated a feedback device such as a linear or rotary encoder (not shown) as part of a CNC system which governs the operation of the drive motors in accordance with instructions input to a computer controller such as the Fanuc model 18i.

The present invention provides a controllable lapping process whereby the lapping process may be modified in order to achieve a desired tooth surface. Preferably, the inventive method is determined by the steps comprising:

1. providing a lap removal efficiency matrix;
2. lapping a gear set, preferably according to one of the following:
   a. lapping with a standard lapping cycle (e.g. 3 point sweep lapping); or
   b. lapping with a reduced time lapping cycle (e.g. 3 point sweep lapping); or
   c. lapping of discrete positions of a tooth surface grid (preferably 3×3) with the amount of time per point being calculated out of the lap removal efficiency matrix (for example, the amount of time necessary to remove 10 microns of material at each grid point). The discrete lapping may be followed by a reduced time 3 point, for example, sweep lapping.
3. measuring pinion and ring gear of a lapped gear set against a theoretical grid such as those generated from a cutting or grinding simulation;
4. consolidating the average flank form deviations of pinion and ring gear flanks versus the nominal flank form;
5. calculating incremental lapping times at discrete contact positions (from lap removal efficiency matrix) as lapping correction matrix;
6. in the case of 2a or 2b, correcting the gear set by lapping corrections at discrete grid positions followed by the original lapping cycle; or in the case of 2c, superimposing the correction matrix (as additional lapping dwell time per grid point) with existing incremental lapping dwell times. Lapping of discrete matrix points first, followed by reduced time 3 point sweep lapping;

7. measuring production gear sets and using consolidated flank form deviations to calculate additional incremental lapping times at the discrete grid positions;

8. superimposing the incremental lapping times on the existing dwell times at corresponding grid points of the production lapping cycle (negative times may also be used as long as the resulting time increments are greater than zero).

A coordinate measurement of a first gear set is conducted after heat treatment. The grid of the flank surface is preferably defined as having three (3) lines and three (3) columns (i.e. a 3×3 grid) with the grid having three (3) points in the heel area (root, center, top), three (3) points in at the mean face (root, center, top) and three (3) points in the toe area (root, center, top). The nine grid points are calculated or found experimentally (e.g. on a roll testing machine) as the offset E, the pinion cone P and the gear cone G values (relative axis positions, pinion versus gear) which are required to move the tooth contact into the distinct 3×3 flank positions. If by gear design, one of the theoretically desired positions (e.g. heel root on the gear flank drive side) cannot be reached, then the closest possible location can be used instead. The set of nine E, P and G axis positions correspond to the flank surface points which can be expressed in a flank projection oriented local coordinate system (XG, YG) or in a global pinion and ring gear coordinate system (X,Y,Z) where the Z-axis is the axis of rotation and the point of origin is the theoretical intersecting point of the pinion and ring gear axes. Of course, grids other than 3×3 are also contemplated.

One or more tooth flanks, preferably at least three tooth flanks, and more preferably at least four tooth flanks, on each of the ring gear and pinion are measured with the results being averaged into a single representative measured tooth flank surface for each of the ring gear and pinion. Regardless of the number of tooth surfaces measured, it is preferred that the selected tooth surfaces be equidistantly spaced about the axis of the particular gear member.

Figure 2:
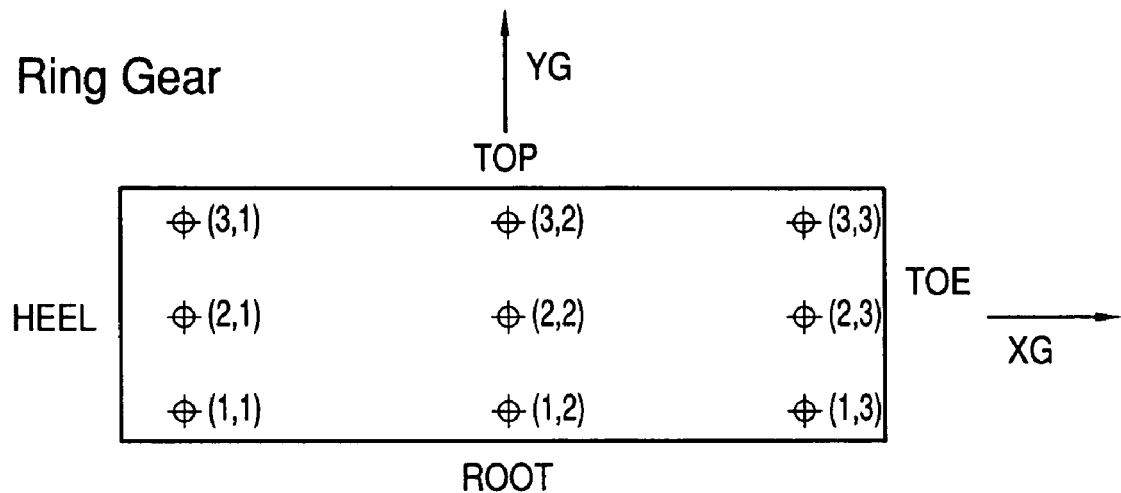
FIG. 2 is a ring gear flank projection having nine grid points.
Figure 3:
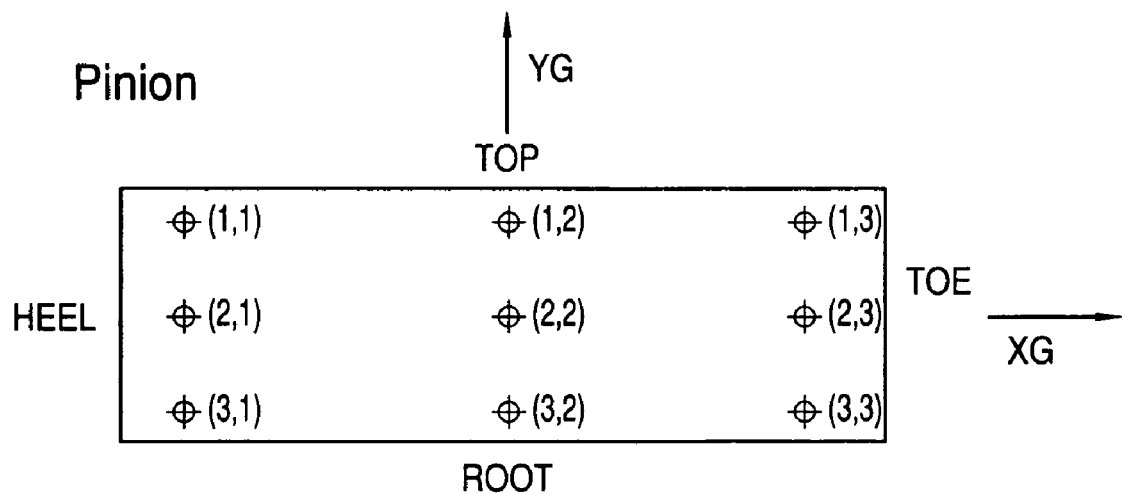
FIG. 3 is a pinion flank projection having nine grid points.

FIGS. 2 and 3 illustrate, respectively, ring gear and pinion flank projections each comprising nine points. For each axis E, P and G, the respective axis position matrices are defined as follows:

$$(E) = \begin{pmatrix} E_{3,1} & E_{3,2} & E_{3,3} \\ E_{2,1} & E_{2,2} & E_{2,3} \\ E_{1,1} & E_{1,2} & E_{1,3} \end{pmatrix} \quad (1)$$

$$(P) = \begin{pmatrix} P_{3,1} & P_{3,2} & P_{3,3} \\ P_{2,1} & P_{2,2} & P_{2,3} \\ P_{1,1} & P_{1,2} & P_{1,3} \end{pmatrix} \quad (2)$$

$$(G) = \begin{pmatrix} G_{3,1} & G_{3,2} & G_{3,3} \\ G_{2,1} & G_{2,2} & G_{2,3} \\ G_{1,1} & G_{1,2} & G_{1,3} \end{pmatrix} \quad (3)$$

Local flank projection coordinate matrices for the ring gear are defined as:

$$(XG) = \begin{pmatrix} XG_{3,1} & XG_{3,2} & XG_{3,3} \\ XG_{2,1} & XG_{2,2} & XG_{2,3} \\ XG_{1,1} & XG_{1,2} & XG_{1,3} \end{pmatrix} \quad (4)$$

$$(YG) = \begin{pmatrix} YG_{3,1} & YG_{3,2} & YG_{3,3} \\ YG_{2,1} & YG_{2,2} & YG_{2,3} \\ YG_{1,1} & YG_{1,2} & YG_{1,3} \end{pmatrix} \quad (5)$$

Global coordinate system flank surface point matrices are defined as:

$$(X)_{Gear} = \begin{pmatrix} X_{3,1} & X_{3,2} & X_{3,3} \\ X_{2,1} & X_{2,2} & X_{2,3} \\ X_{1,1} & X_{1,2} & X_{1,3} \end{pmatrix}_{Gear} \quad (6)$$

$$(Y)_{Gear} = \begin{pmatrix} Y_{3,1} & Y_{3,2} & Y_{3,3} \\ Y_{2,1} & Y_{2,2} & Y_{2,3} \\ Y_{1,1} & Y_{1,2} & Y_{1,3} \end{pmatrix}_{Gear} \quad (7)$$

$$(Z)_{Gear} = \begin{pmatrix} Z_{3,1} & Z_{3,2} & Z_{3,3} \\ Z_{2,1} & Z_{2,2} & Z_{2,3} \\ Z_{1,1} & Z_{1,2} & Z_{1,3} \end{pmatrix}_{Gear} \quad (8)$$

Local flank projection coordinate matrices for the pinion are defined as:

$$(XG) = \begin{pmatrix} XG_{1,1} & XG_{1,2} & XG_{1,3} \\ XG_{2,1} & XG_{2,2} & XG_{2,3} \\ XG_{3,1} & XG_{3,2} & XG_{3,3} \end{pmatrix} \quad (9)$$

$$(YG) = \begin{pmatrix} YG_{1,1} & YG_{1,2} & YG_{1,3} \\ YG_{2,1} & YG_{2,2} & YG_{2,3} \\ YG_{3,1} & YG_{3,2} & YG_{3,3} \end{pmatrix} \quad (10)$$

The Global Coordinate System flank surface point matrices for the pinion are defined as:

$$(X)_{Pinion} = \begin{pmatrix} X_{1,1} & X_{1,2} & X_{1,3} \\ X_{2,1} & X_{2,2} & X_{2,3} \\ X_{3,1} & X_{3,2} & X_{3,3} \end{pmatrix}_{Pinion} \quad (11)$$

$$(Y)_{Pinion} = \begin{pmatrix} Y_{1,1} & Y_{1,2} & Y_{1,3} \\ Y_{2,1} & Y_{2,2} & Y_{2,3} \\ Y_{3,1} & Y_{2,2} & Y_{3,3} \end{pmatrix}_{Pinion} \quad (12)$$

$$(Z)_{Pinion} = \begin{pmatrix} Z_{1,1} & Z_{2,2} & Z_{1,3} \\ Z_{2,1} & Z_{2,2} & Z_{2,3} \\ Z_{3,1} & Z_{2,2} & Z_{3,3} \end{pmatrix}_{Pinion} \quad (13)$$

The gear set is then lapped wherein the lapping may be accomplished by different lapping cycles, for example, as follows:

1. standard lapping cycle (e.g. 3 point sweep lapping);
2. lapping of the gear set with a reduced time lapping cycle (e.g. 3 point sweep lapping); or
3. lapping of discrete positions of a 3×3 grid (with the lapping time per position calculated out of the lap removal efficiency matrix in order to remove a desired amount (e.g. 10 microns) of material) followed by a reduced time 3 point sweep lapping cycle.

Preferably, lapping cycle #3 above is carried out since this results in a lapping cycle containing both lapping modes (discrete point lapping and 3 point sweep lapping). This also provides a "base load" for the discrete point lapping which means that in a later correction, Δ-value correction values can not only be added but may also be subtracted to some extent. The lapping machine control is programmed to move the axes successively to all nine grid points. The machine dwells at each point for a specified amount of time (e.g. one second) while the spindles are rotating in one of the previously described modes (e.g. pinion rotates and ring gear resists with a certain braking torque). The movement from one grid point to the next requires a repositioning of the lapping machine axes which must be fast enough to avoid much lapping removal during the repositioning but must not be too fast so as to cause impulse and acceleration forces which would result in additional, unwanted material removal.

Figure 4:
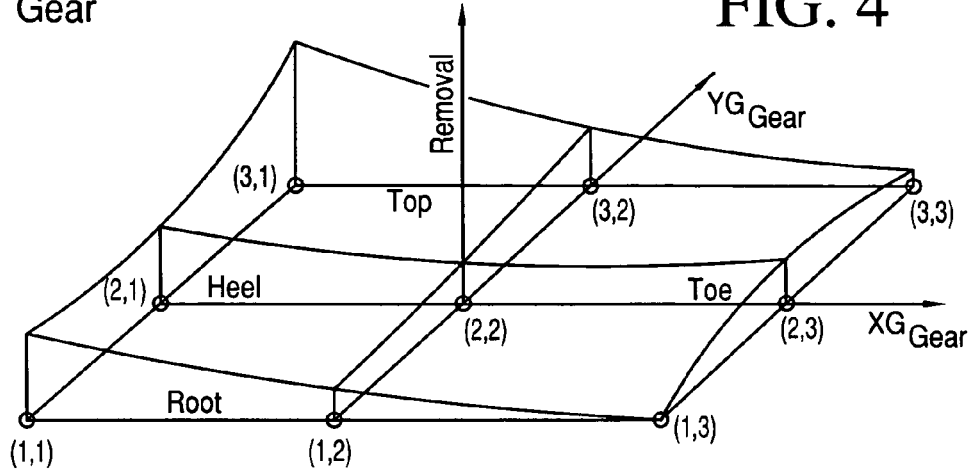
FIG. 4 illustrates an example of lapping removal efficiency values for a ring gear.
Figure 5:
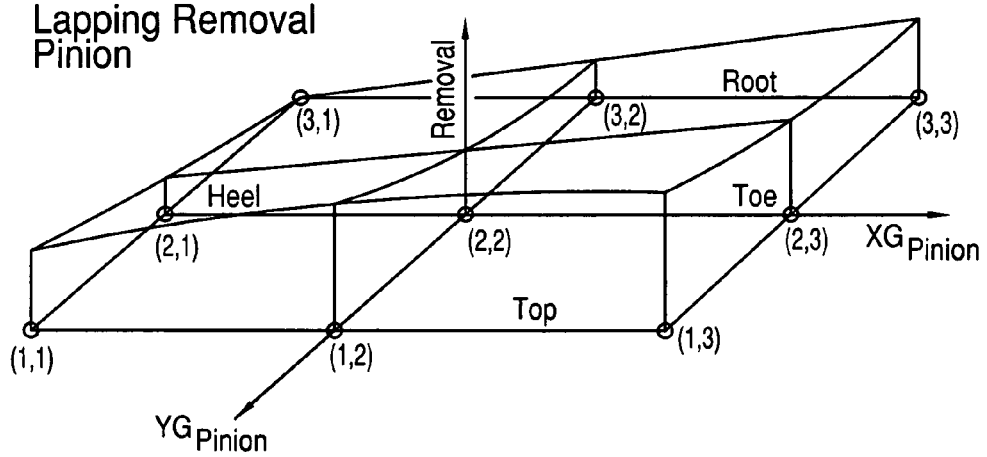
FIG. 5 illustrates an example of lapping removal efficiency values for a pinion.
Figure 6:
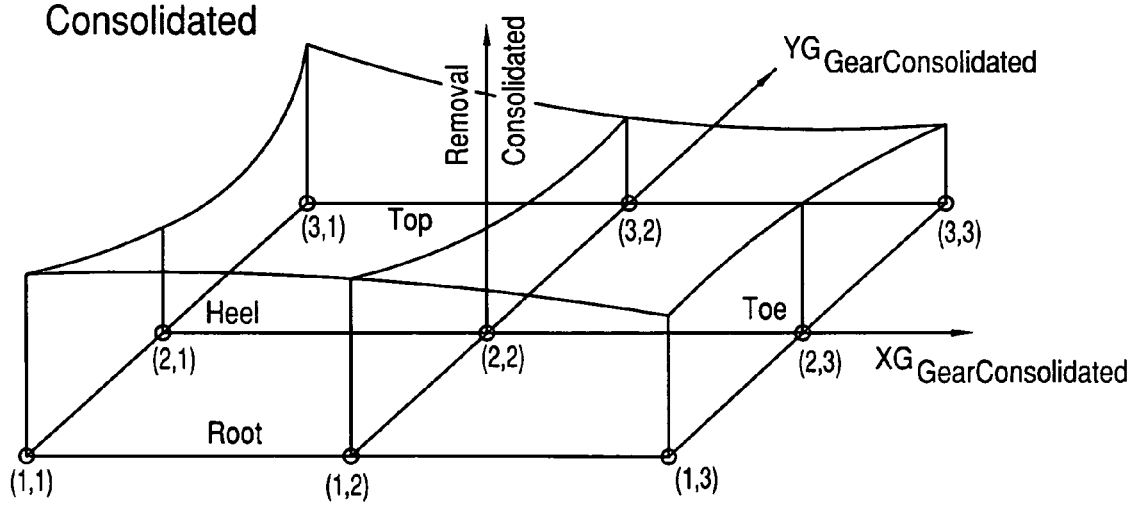
FIG. 6 illustrates an example of consolidated lapping removal efficiency values for a ring gear and pinion.

After lapping at all grid points (on the coast and drive side flank pairs) the gear set is removed from the lapping machine, washed and re-measured on a coordinate measuring machine. The difference between the measurement after heat treatment and the measurement after incremental lapping of the grid points (normal to the surface) are the lapping removal efficiency values for the ring gear (FIG. 4) and pinion (FIG. 5). If the point numbering is done consistently between pinion and ring gear for corresponding numbers, as is preferred, (note: pinion root meshes with ring gear top) then the removal efficiency values of pinion and ring gear can be consolidated as shown in FIG. 6 (FIG. 4+FIG. 5=FIG. 6) by adding points with identical subscript numbering with the correct sign which leads to a Lapping Efficiency matrix ($L_e$) where each element is calculated by dividing the Removal Consolidated (in point i, j) by the Dwell Time (in point i, j). The unit of the elements in the lapping efficiency matrix is micron/sec.

Accordingly, the Lapping Efficiency matrix is defined as:

$$(L_e) = \begin{pmatrix} L_{e_{3,1}} & L_{e_{3,2}} & L_{e_{3,3}} \\ L_{e_{2,1}} & L_{e_{2,2}} & L_{e_{2,3}} \\ L_{e_{1,1}} & L_{e_{1,2}} & L_{e_{1,3}} \end{pmatrix} \quad (14)$$

with each lapping efficiency element being defined as:

$$L_{e_{(i,j)}} = \frac{(\text{Removal Consolidated})_{i,j}}{(\text{Dwell Time})_{i,j}} \left[\frac{\text{microns}}{\text{sec}}\right] \quad (15)$$

A second gear set (of the same specifications as the first gear set) is then lapped, preferably by a reduced time lapping cycle (e.g. 3 point sweep lapping). After the initial lapping of the gear set, the pinion and ring gear are also measured against theoretical surface coordinates preferably generated from a cutting or grinding process simulation. The theoretically generated surface coordinates (i.e. a reference surface) are calculated preferably above the same local flank coordinate system which are used to determine the lapping efficiency values and are used for the discrete, incremental lapping point matrix. This simplifies the following consolidation of pinion and ring gear deviations as well as the calculation of correction values to the initial lapping cycle.

Figure 7:
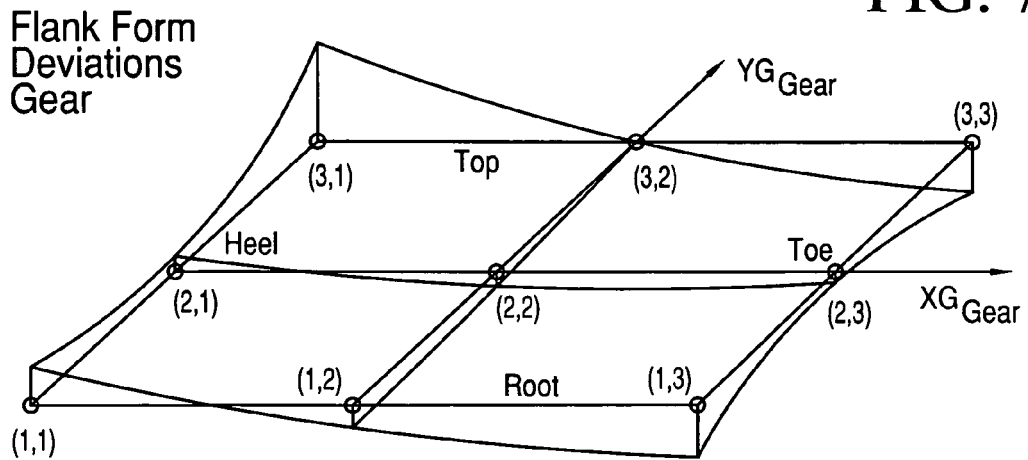
FIG. 7 shows an example of flank form deviations of a ring gear.
Figure 8:
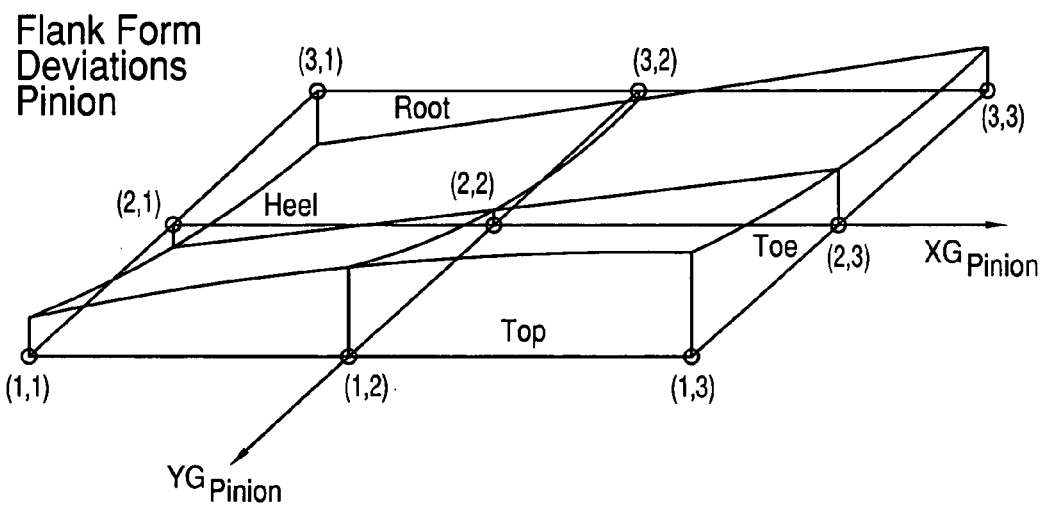
FIG. 8 shows an example of flank form deviations of a pinion.
Figure 9:
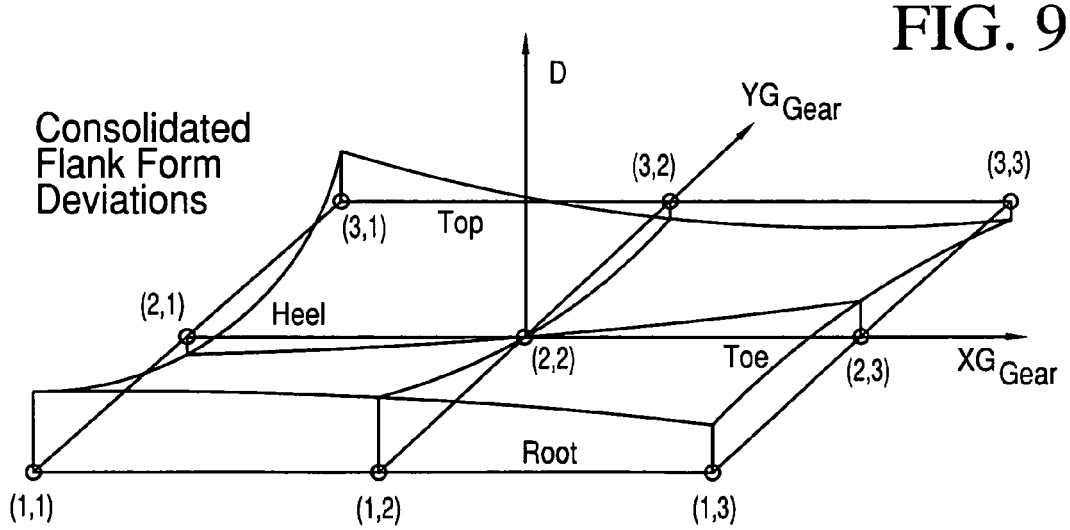
FIG. 9 shows an example of consolidated flank form deviations of a ring gear and pinion.

If the point numbering is done consistent between the pinion and gear for corresponding numbers like that proposed above then the flank form deviations (normal to the surfaces) of the ring gear (FIG. 7) and pinion (FIG. 8) can be consolidated as shown in FIG. 9 (FIG. 7+FIG. 8=FIG. 9) simply by adding points with identical subscript numbering with the correct sign which leads to the Consolidated Flank Form Deviation surface and a corresponding matrix as defined below:

$$(D) = \begin{pmatrix} D_{3,1} & D_{3,2} & D_{3,3} \\ D_{2,1} & D_{2,2} & D_{2,3} \\ D_{1,1} & D_{1,2} & D_{1,3} \end{pmatrix} \quad (16)$$

Theoretical flank coordinates (the reference surface) may also be derived from different processes than cutting according to the face hobbing or face milling method or grinding according to the face milling method. A reference surface may also be defined by the surface coordinates of an actual gear member, such as a cut, ground or lapped gear member. Manipulations of conventional flank forms or even completely unconventional flank forms may also be used as the nominal target reference surface after the lapping process.

The elements in the Consolidated Flank Form Deviation matrix are divided by the corresponding elements of the Lapping Removal Efficiency Value matrix to obtain the Correction matrix (unit of elements in matrix=seconds):

$$(C) = \begin{pmatrix} D_{3,1}/L_{e_{3,1}} & D_{3,2}/L_{e_{3,2}} & D_{3,3}/L_{e_{3,3}} \\ D_{2,1}/L_{e_{2,1}} & D_{2,2}/L_{e_{2,2}} & D_{2,3}/L_{e_{2,3}} \\ D_{1,1}/L_{e_{1,1}} & D_{1,2}/L_{e_{1,2}} & D_{1,3}/L_{e_{1,3}} \end{pmatrix} \quad (17)$$

If production lapping is to be carried out by one of the previously discussed gear lapping cycles of:

(a) lapping with a standard lapping cycle (e.g. 3 point sweep lapping); or (b) lapping with a reduced time lapping cycle (e.g. 3 point sweep lapping);

the corrections in (C) above are preferably applied at the respective discrete grid positions, according to the dwell times obtained from Correction matrix, followed by the original lapping cycle (a) or (b). It should be noted that any negative dwell times in (C) must be set to zero. It is also possible to add a constant amount to every element of the matrix in order to eliminate negative values.

With respect to production lapping according to cycle (c) discussed above, namely:

(c) lapping of discrete positions of a tooth surface grid (preferably 3×3) with the amount of time per point being calculated out of the lap removal efficiency matrix (for example, the amount of time necessary to remove 10 microns of material at each grid point) followed by a reduced time 3 point sweep lapping.

the Correction matrix (C) (as additional lapping dwell time per grid point) is superimposed with existing incremental lapping dwell times. Lapping of discrete grid points is preferably performed first followed by a reduced time sweep lapping (3 point for example).

In production, gears sets are preferably lapped in accordance with the desired original lapping cycle (such as by (a), (b) or (c) above) and the corrections determined by the Correction matrix (C) as described above. However, periodic measurement of lapped gear sets should be carried out (e.g.

every 20$^{th}$ or 50$^{th}$ gear set) to determine if any adjustments to the Correction matrix are necessary. Based on any measured discrepancies, a revised Consolidated Flank Form Deviation (D) is established and is utilized to calculate additional incremental lapping times at the discrete grid positions (based on the Lapping Removal Efficiency matrix, ($L_e$)), as a revised Lapping Correction matrix (C). As long as the gear set specifications, materials and processing remain unchanged, there is no need to determine a new the Lapping Removal Efficiency matrix at each such periodic measurement.

The elements of the correction matrix (C) are preferably added to the existing lapping matrix of dwell times at corresponding grid points of the production lapping cycle to improve the production stability. Negative times may be used as long as the resulting time increments are all greater than or equal to zero.

While it is preferred to introduce corrections at discrete points prior to any sweep lapping (standard or reduced time cycles), the present invention is not limited thereto. Corrections may by effected subsequent to sweep lapping. It is also noted that sweep lapping (standard or reduced) defined by a plurality of points other than three are likewise contemplated by the present invention. Additionally, while it is preferred to add discrete point corrections to existing corresponding discrete point lapping times, the corrections (positive or zero values only) may be introduced in a separate cycle. It should also be noted that while it is preferred to lap at all grid points (except, perhaps, where a consolidated grid point value is zero or negative), the present invention further contemplates lapping at only selected grid points. For example, only three points in the toe area of a tooth may be lapped or two points in the root area of a tooth may be lapped. Lapping according to non-linear patterns of selected grid points may also be realized.

Furthermore, the present invention also contemplates lapping utilizing only the corrective lapping amounts at the respective grid points (i.e. previously described lapping cycles (a), (b) or (c) are not utilized in production lapping). In such a case, it is not necessary to conduct lapping prior to the pinion and ring gear being measured against theoretical surface coordinates when establishing the initial Correction matrix for the gear set.

Although the present invention has been discussed with respect to bevel gears, the inventive process is also applicable to lapping cylindrical (e.g. spur and helical) gears.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of lapping a gear set comprising first and second gear members with said first gear member having a plurality of tooth flank surfaces and said second gear member having a plurality of tooth flank surfaces, said method comprising:
    defining a plurality of grid points on the tooth flank surfaces of each of said first and second gear members,
    determining a lapping correction for more than one of said plurality of grid points, said lapping correction having a magnitude and defining an amount of lapping time at each of said more than one of said plurality of grid points whereby an amount of stock material is removed at said each of said more than one of said plurality of grid points, wherein the amount of stock material removed at each of said more than one of said plurality of grid points is dependent upon the magnitude of the lapping correction at the respective each of said more than one of said plurality of grid points,
    lapping said gear set by rotating said first gear member in mesh with said second gear member in a manner such that contact between the members is shifted from at least a first grid point to a second grid point whereby lapping contact is maintained at each contacted grid point for a time sufficient for removal of said amount of stock material at said each contacted grid point.

2. The method of claim 1 wherein a lapping correction is determined for each of said plurality of grid points.

3. The method of claim 2 wherein lapping is carried out at each of said plurality of grid points.

4. The method of claim 1 further including a lapping cycle performed in sequence with the steps of defining, determining and lapping.

5. The method of claim 4 wherein said lapping cycle comprises sweep lapping at a predetermined number of points on the tooth flank surfaces.

6. The method of claim 4 wherein said lapping cycle comprises reduced sweep lapping at a predetermined number of points on the tooth flank surfaces.

7. The method of claim 4 wherein said lapping cycle comprises lapping of discrete positions on the tooth flank surfaces and being defined by a tooth surface grid.

8. The method of claim 1 wherein said lapping correction for more than one of said plurality of grid points is defined by (a) a positional deviation of measured said more than one of said plurality of grid points from a respective reference position of said more than one of said plurality of grid points, divided by (b) a lapping efficiency removal value for the respective said more than one of said plurality of grid points.

9. The method of claim 8 wherein subsequent to a predetermined number of gear sets being lapped, said positional deviation is again measured and a new lapping correction is established.

10. The method of claim 1 wherein said plurality of grid points on the tooth flank surfaces of each of said first and second gear members correspond when in mesh and wherein said lapping correction is represented as a consolidated grid surface.

11. A method of lapping a gear set comprising first and second gear members, said method comprising:
    defining a plurality of grid points on the tooth flank surfaces of each of said first and second gear members wherein the grid points on the tooth flank surfaces of each of said first and second gear members correspond when in mesh,
    determining a lapping correction for each of said plurality of grid points wherein said lapping correction is represented as a consolidated first and second gear member grid surface, said lapping correction having a magnitude and defining an amount of lapping at each of said grid points whereby an amount of stock material is removed at said each of said grid points, wherein the amount of stock material removed at each of said grid points is dependent upon the magnitude of the lapping correction at the respective each of said grid points,
    lapping said gear set by rotating said first gear member in mesh with said second gear member in a manner such that contact between the members is shifted from at least a first pair of corresponding grid points to a second pair of corresponding grid points whereby lapping contact is maintained at each contacted grid point pair for a time sufficient for removal of said amount of stock material at said each contacted grid point pair.

12. The method of claim 11 wherein said lapping correction is defined by (a) the a positional deviation of measured grid points from a respective reference position of said grid points, divided by (b) a lapping efficiency removal value for the respective grid points, wherein the positional deviation of measured grid points and the lapping efficiency removal values are each represented as a consolidated grid surface.

13. The method of claim 12 wherein subsequent to a predetermined number of gear sets being lapped, said positional deviation is again measured and a new lapping correction is established.

14. The method of claim 11 further including another lapping cycle being performed in sequence therewith.

15. The method of claim 11 wherein said another lapping cycle comprises sweep lapping at a predetermined number of points on the tooth flank surfaces.

16. The method of claim 11 wherein said another lapping cycle comprises reduced sweep lapping at a predetermined number of points on the tooth flank surfaces.

17. The method of claim 11 wherein said another lapping cycle comprises lapping of discrete positions on the tooth flank surfaces and being defined by the grid points.

* * * * *